Nov. 22, 1966    M. E. TAYLOR    3,287,695
SELF-ADJUSTING INVERSE FILTER
Filed June 22, 1964    8 Sheets-Sheet 1

Fig. 2
FREQUENCY RESPONSE OF
RECEIVED SEISMIC SIGNAL
(EARTH FILTER)

Fig. 3
FREQUENCY RESPONSE
OF REQUIRED
INVERSE FILTER

INVENTOR.
MAURICE E. TAYLOR
BY
ATTORNEY.

Fig. 4
FREQUENCY RESPONSE
OF BAND ABSORPTION
FILTER
(TYPE A SECTION)

Fig. 5
IDEALIZED
FREQUENCY RESPONSE
OF HIGH EMPHASIS
FILTER
(TYPE B SECTION)

Fig. 6
IDEALIZED
FREQUENCY RESPONSE
OF LOW EMPHASIS
FILTER
(TYPE C SECTION)

INVENTOR.
MAURICE E. TAYLOR
BY

ATTORNEY.

Fig. 16
HIGH EMPHASIS UNIT

Fig. 17
LOW EMPHASIS UNIT

INVENTOR.
MAURICE E. TAYLOR
BY
ATTORNEY.

INVENTOR.
MAURICE E. TAYLOR
BY
ATTORNEY.

*Fig. 12*
FREQUENCY RESPONSE OF ANALYZER FILTERS

INVENTOR.
MAURICE E. TAYLOR
BY
ATTORNEY.

Fig. 18

United States Patent Office 3,287,695
Patented Nov. 22, 1966

3,287,695
SELF-ADJUSTING INVERSE FILTER
Maurice E. Taylor, Monroeville, Pa., assignor to Gulf Research & Development Company, Pittsburgh, Pa., a corporation of Delaware
Filed June 22, 1964, Ser. No. 376,981
12 Claims. (Cl. 340—15.5)

This invention relates to electrical signal processing systems and in particular relates to an automatic self-adjusting inverse filter that is particularly advantageous for use in the seismic geophysical prospecting art.

In seismic geophysical operations it is common to explode a charge of dynamite at or near the surface of the ground and to pick up the resulting earth tremors at spaced points by means of geophones whose electrical signals are amplified and recorded for subsequent analysis. The analysis of the recorded seismic signals is usually performed at a central processing facility where the signal is subjected to a number of operations whose purpose is to sort out and identify the useful seismic impulses from a background of extraneous noise, which noise although originating at the shot point is of such a character as not to give any useful geological information. In general the problem is one of improving the signal-to-noise ratio of seismic reflections in order that the reflections may be more clearly resolved and accurately timed in such a way as to provide the maximum amount of subsurface geological information. It has further been found advantageous in seismic prospecting to record the received signals in high fidelity form, that is to record all received signals in a reliable manner and to perform the necessary processing operations to upgrade the seismogram at a subsequent time. For this purpose the seismograms are generally recorded on magnetic tape in conventional manner and the tape may subsequently be played back repeatedly with appropriate processing apparatus. This invention pertains to a seismogram analysis method and apparatus that materially improves the usefulness of a seismic reflection seismogram.

It is well known that a subsurface explosion such as that produced by a charge of dynamite exploded in a shot hole contains substantially all frequency components over a wide range. It is further well known that the earth tremors commonly recorded at a distant location do not contain all frequencies, and it is recognized that many frequencies have been attenuated somewhere in the intervening transmission system. One may conclude that the transmission system, namely, the earth, has filtered the signal. Both the degree and the nature of the filtering is known to vary materially from place to place. It is commonly found that the recorded seismic signal is relatively deficient in low frequencies and also relatively deficient in high frequencies. The deficiency in low frequencies usually results from instrumental limitations, whereas the deficiency in high frequencies results directly from earth attenuation. In the processing of reflection seismograms it is desirable to compensate for earth and instrument filtering in order to restore, at least within practical limits, the same signal impulse as originated at the shot point.

Various means have been suggested in the prior art for upgrading, i.e. improving the signal-to-noise ratio of a reflection seismogram, but all of these systems are deficient in one or more respects. In particular it is common to subject the high-fidelity seismic signal, as recorded on magnetic tape and reproduced therefrom, to filtering in order to accentuate certain frequencies which are thought to characterize the reflections. While this has been capable of improving the record to some extent, it is recognized that the filter itself may cause complication in the nature of phase shifts, pulse tailing, etc. Correlation techniques have also been employed in order to identify the reflections from one seismogram to the next, but these are time-consuming and laborious techniques which require preliminary processing if advantageous results are to be obtained.

It is apparent that if the earth is considered as a filter acting on the seismic impulse as it traverses the earth between the shot point and geophone, one may conceive of a filter which would have the inverse characteristic of the earth filter. By transmitting the received seismic signal through such an inverse filter one may obtain a reconstructed seismogram in which the original seismic impulse, namely a relatively sharp impulse signal, is reproduced at each reflection. Such impulses can be shown to have the sharpest correlation function when correlation techniques are employed, and such impulses are in any case more easily identified on a seismogram than a decaying-wave-train type of impulse. Furthermore, the on-set of such a sharp impulse can be determined with a higher degree of precision than the much more gentle on-set of a wave train.

A series difficulty arises in attempting to provide an inverse filter of the above-mentioned type in that the character of the earth filter varies from place to place in an unknown manner. Inasmuch as the first (earth) filter is unknown, the nature of its inverse is also unknown. Whereas attenuation equalizers may be employed to restore the various frequency components in the seismic signal, for example, as disclosed in copending application by Maurice E. Taylor filed September 29, 1961, under Ser. No. 141,724, now United States Patent No. 3,150,327, such attenuation equalizers are limited in the precision of equalization which they can accomplish because the frequency band on which they operate is of fixed shape. Furthermore, such attenuation equalizers, while satisfactory to the extent of restoring attenuated frequency components, are incapable of restoring these components in the original phase relationship so that the seismogram processed through such an equalizer requires further improvement. Such improvement is obtained by employing the present invention in conjunction with an attenuation equalizer or other known seismic signal processing equipment.

It is a purpose of this invention to provide a method and apparatus for inverse filtering of a seismogram previously filtered by transmission through the earth in such manner that the inverse filtering is automatically self-adjusted to the proper characteristic.

It is a further object of this invention to provide a seismogram-processing system in which frequency components attenuated by transmission through the earth are automatically restored both in amplitude and phase relation.

It is a further object of this invention to provide an automatically self-adjusting inverse filter for a seismic signal processing system which results in a seismogram of improved reflection character.

It is a further object of this invention to provide an automatically self-adjusting inverse filter tha thas a minimum phase correction.

It is a further object of this invention to provide an automatically self-adjusting inverse filter in which both the dominant frequency and the slopes of both sides of the response curve are automatically adjusted.

It is a further object of this invention to provide a method of adjusting the frequency response of an inverse filter by adjusting the dominant frequency and separately adjusting the slopes of both sides of the response curve.

These and other objects of this invention are attained by the method and apparatus disclosed in this specification with reference to the accompanying drawings forming a part thereof, and in which.

It has been found that the filter representative of the earth varies substantially from place to place and is even different for each detector signal when arising from a common shot point. The earth filter as the term is used herein includes filtering resulting from transmission of the seismic impulse through the earth and also includes other effects such as that caused by weathered ground at the shot hole, the detector plant, instrumentation, etc. The variations in the nature of earth filtering account for changes in character of a seismogram record from trace to trace and in time (depth). These changes are known to be quite subtle and it is often found that while the peak frequency of the earth filter characteristic may remain substantially the same from record to record, the width of the band and the slope of its sides varies sufficiently from record to record and also with time to require a different type of inverse filter for each record trace and at each instant of time. Accordingly the inverse filter must not only be capable of adjustment with respect to predominant frequency but the slope of the frequency characteristic must be adjustable, preferably independently adjustable on the high-frequency side and on the low-frequency side. In this invention the predominant frequency of the inverse filter is continuously automatically adjusted and the slopes of both the high frequency and the low frequency sides are also continuously automatically and separately adjusted so as to flatten the frequency spectrum of the output signal. Furthermore, the electrical networks employed in the inverse filter of this invention are all of a so-called minimum-phase correction type, so that their combination as herein employed results in a minimum phase correction processing system which over the desired frequency band restores not only the amplitude characteristic but also the phase characteristic of the seismogram. The seismogram may, of course, be subjected to conventional techniques for suppressing noise and these do not interfere with the present invention.

In this invention the reproduced seismogram is transmitted through a cascade of filters each of which functions to provide an inverse filtering effect such that the combined effect of the cascade very closely approximates the required inverse filter. Three groups of filter elements are employed, each filter element comprising an operational amplifier circuit having an adjustable element in its feedback or input circuit which elements are individually automatically adjusted in a prescribed way to be explained.

The first group of filter elements provides a relatively narrow band-absorption type of filtering effect. The predominant frequency of the band is continuously automatically adjusted by controlling the impedance of a saturable core reactor in the filter network. The control current through the saturable core reactor is obtained from a frequency determining network that senses the predominant frequency of the input signal. It has been found that one such band-absorption filter element usually suffices but two or more may be employed.

A second group of filter elements comprises a plurality of high-emphasis filter sections having a controlled low-frequency asymptote. The sharpness of the transition from the low to high frequency response is continuously automatically adjusted by controlling the height of the low-frequency asymptote. This is accomplished by controlling one of the feedback resistors of the operational amplifier network. The adjustment is accomplished in steps by effectively connecting additional shunts in parallel with the controlled resistor. A substantial number of such filter sections is employed, as for example, seven such high-emphasis sections, each of which has a plurality of adjustments as to the height of its low-frequency asymptote.

A third group of filter elements comprises a plurality of low-emphasis filter sections whose high-frequency asymptote is adjustable. The sharpness of the transition from low to high frequency response is continuously automatically adjusted by controlling the height of the high-frequency asymptote, this being accomplished in steps by connecting shunting resistors in parallel with one of the feedback resistors in the feedback circuit of the operational amplifier network. A number of such low-emphasis filter sections is employed, as for example, three such units, each of which has a plurality of adjustments as to the height of its high-frequency asymptote.

The high-emphasis and low-emphasis filter sections represent a substantial number of control points each of which is provided with control means actuated in response to signals from a multiplicity of parallel-connected narrow band-pass filters connected thereto. The multiplicity of narrow band-pass filters serves to perform a frequency-amplitude analysis of the signal. The outputs of the respective band-pass filters are rectified and the rectified outputs are compared in pairs, the comparison signals being then employed to actuate trigger circuits that serve to close circuits to the appropriate shunting resistors in the respective high-emphasis and/or low-emphasis filter sections, thereby to continuously automatically adjust the overall frequency characteristic of the system to conform to the required inverse filter.

Since it is known that the earth filtering attenuates the very high frequencies and the very low frequencies, it is apparent that the frequency characteristic of the earth filter may be represented by a curve whose shape is that of a smooth hump. Accordingly, the inverse filter will have a frequency characteristic having a depression or valley in order to flatten the resulting frequency spectrum. The characteristic of the inverse filter may be described as having a dominant frequency which corresponds to the peak frequency of the earth filter, the term "dominant frequency" referring to the bottom of the depression or valley in the inverse filter response curve. Similarly the inverse filters which have high-frequency emphasis and low-frequency emphasis characteristics will be referred to as "high emphasis" and "low emphasis" filters respectively in order to identify the type of filter that is meant. Each high-emphasis and each low-emphasis filter section has a transition frequency at the respective transition from low-frequency response to high-frequency response or vice versa.

Figure 1:
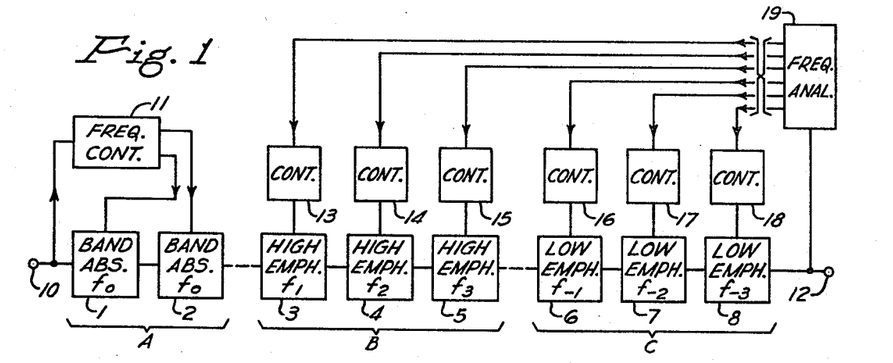
FIGURE 1 is a functional block diagram showing the interrelation of the various elements employed in this invention.

FIGURE 1 is a block diagram that shows the various parts of the invention in its preferred embodiment and the functional interrelationships of the respective parts. The inverse filter comprises a cascade of filter sections 1 to 8 inclusive and includes three types of filter sections identified as A, B, and C. Input signal is applied at terminal 10 and is transmitted in cascade through the successive filter sections 1 to 8 to an output terminal 12. Each type A, B, or C filter may comprise one or a plurality of similar type sections. By way of example only and not by way of limitation, there are illustrated two type A sections, three type B sections, and three type C sections. It is well known that in a filter cascade such as shown in FIGURE 1 the frequency response of the entire filter network is the product of frequency responses of all the respective filter sections. Each section is provided with a control means indicated by elements 11 and 13 to 18 inclusive. A common control 11 is shown for the type A sections but this is not essential and each type A section may have its own control. A common control 19 is shown for all the type B and type C sections, but each type may have its own control, or each section may have its own control.

The type A filter sections 1, 2, and others like them if needed, are band-absorption filters having a frequency characteristic similar to curve 30 of FIGURE 4 to which further reference will be made later. The dominant frequency $f_0$ of the type A filter section is determined by the band-absorption frequency control 11 which receives its input signal from the input terminal 10 of the cascade.

The type B filter sections 3, 4, 5, and others like them if needed, are high-emphasis filter sections, each having a frequency characteristic similar to curve 32 of FIGURE 5 to which further reference will be made later. The type B filter sections 3, 4, 5, etc. have different predetermined fixed transition frequencies $f_1$, $f_2$, $f_3$, etc. The low-frequency asymptote or minimum pass amplitude, i.e. the minimum percent transmission of each type B filter section, is controlled by a minimum pass amplitude control illustrated by 13, 14, 15 and others like them if more type B filter sections are employed. The minimum pass amplitude control units 13, 14, 15, receive their input from frequency analyzer unit 19 connected to the output terminal 12 of the cascade.

The type C filter sections 6, 7, 8, and others like them if needed, are low-emphasis filter sections each having a frequency characteristic similar to curve 42 of FIGURE 6 to which further reference will be made later. The type C filter sections 6, 7, 8, etc. have different predetermined fixed transition frequencies $f_1$, $f_2$, $f_3$, etc. The high-frequency asymptote or minimum pass amplitude, i.e. the minimum percent transmission of each type C filter section, is controlled by a minimum pass amplitude control illustrated by 16, 17, 18 and others like them if more type C filter sections are employed. The minimum pass amplitude control units 16, 17, and 18 receive their input from frequency analyzer 19 connected to the output terminal 12 of the cascade. It is convenient to use a common frequency analyzer 19 to actuate all the minimum pass amplitude controls 13 to 18, but this is not essential and separate frequency analyzers may be employed for each group of filter sections or each filter section if desired. Examples of each of the elements shown in FIGURE 1 and how they accomplish their respective functions will be explained in detail later.

Figure 2:
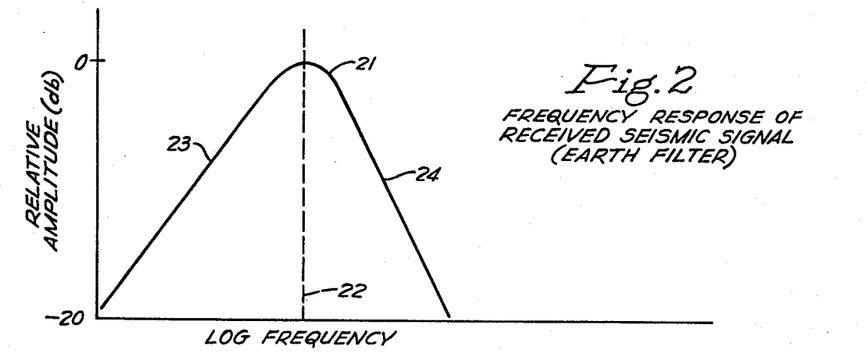
FIGURE 2 is an example of a typical earth filter frequency characteristic for which an inverse filter is automatically provided by this invention.

Referring now to FIGURE 2 there is illustrated by curve 21 the frequency characteristic of a typical earth filter. The curve 21 will be referred to as characteristic of the earth filter, but this may include also the effect of the seismic detector plant and other effects known to be dependent on the nature of the earth. The curve 21 shows the amplitude of the received seismic signal as a function of frequency. It is noted that the curve has a maximum at frequency 22 (herein termed the predominant frequency) and gradually falls substantially to zero at very high and very low frequencies. It has been found that the dominant or peak frequency 22 varies from place to place and with time, but is usually in the range between 10 and 100 c.p.s. The peak of the curve is known to be relatively sharp in some localities and quite broad in other localities. The peak frequency and the width of the band also vary with time. Moreover, the slope of the low-frequency side 23 usually differs from that of the high-frequency side 24 and both slopes vary with location and with time. Accordingly, a filter that has a characteristic that is the inverse of curve 21 must take these factors into consideration.

Figure 3:
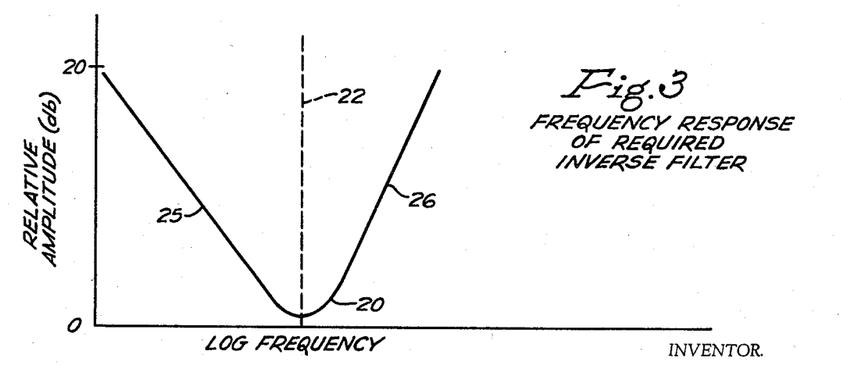
FIGURE 3 is an example of the frequency characteristic of the inverse filter automatically provided by this invention.

FIGURE 3 illustrates in curve 20 the frequency characteristic of a filter whose characteristic is the inverse of curve 21 of FIGURE 2. Curve 20 shows the pass characteristic of the inverse of the filter having the pass characteristic represented by curve 21 of FIGURE 2, the inverse filter serving to flatten the frequency spectrum. The frequency characteristic curve 20 of the inverse filter shows a dominant frequency 22 that is the same frequency as 22 of curve 21 of FIGURE 1. It is apparent that in order to flatten the frequency spectrum, the curve 20 is the reciprocal of curve 22 so that the product of the ordinates of these curves is a constant.

In the method of this invention the dominant frequency of the inverse filter is adjusted to match the dominant frequency 22 of the curve 21 of FIGURE 2, and the slopes of the two sides of the response curve of the inverse filter are separately adjusted to match the slopes of the sides 23 and 24 of the curve of FIGURE 2. In this manner the curve 20 of FIGURE 3 is attained. As will become evident, the respective adjustments are made continuously and automatically. In providing an adjustable inverse filter several considerations are taken into account. In this invention the desired filter characteristics are attained by cascading a number of filters that are independently adjustable. It is well known that the frequency response curve of a series-connected cascade is proportional to the product of the respective response curves. It has been found that the filtering effect of the earth is relatively sharp and in any general area usually centers about a specific frequency herein termed the dominant frequency. However, the slope of the frequency characteristic representing the pass band of the earth varies substantially from place to place even in the same locality. In this invention the proper inverse filter is obtained by providing a band-absorption filter, the slopes of whose sides are independently adjustable. In this invention this is accomplished by employing a band-absorption filter cascaded with a number of high-emphasis filter sections and low-emphasis filter sections which serve to broaden or narrow the band of the band-absorption filter as best explained by reference to FIGURES 4, 5, and 6.

Figure 4:
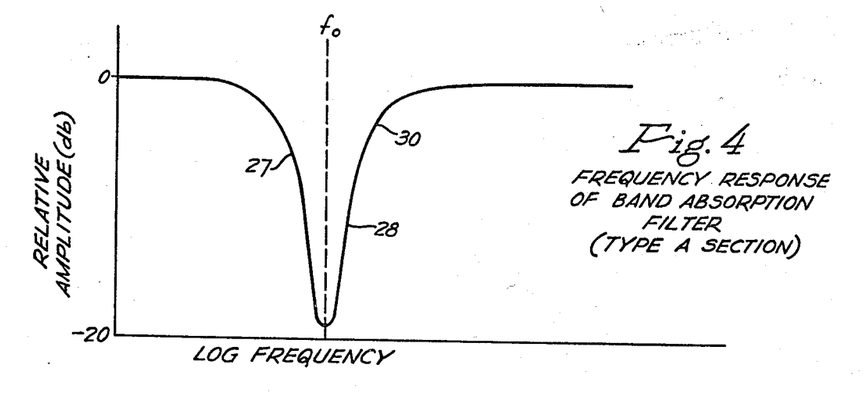
FIGURE 4 illustrates the frequency characteristic of a band-absorption filter section employed in this invention.

In order to provide a filter having a frequency characteristic curve of the type illustrated by curve 20 of FIGURE 3, this invention employs a first filter having an attenuation band of FIGURE 4 whose dominant frequency $f_o$ is at the desired frequency 22. The frequency $f_o$ is continuously automatically adjusted by controlling the inductance of a saturable-core inductor in the tuned circuit of the band-absorption filter section as will become evident later. An example of such a band-absorption filter characteristic is illustrated by curve 30 of FIGURE 4 having a dominant frequency $f_o$. In order to control the high-frequency limb 26 (FIGURE 3) of the cascaded combination of filter sections shown in FIGURE 1, the filter section whose characteristic is given by curve 30 is cascaded with a high-emphasis filter section having a characteristic exemplified by the curve 32 of FIGURE 5, the transition frequency of the filter represented by curve 32 being at a predetermined frequency $f_1$ (different from $f_o$). The characteristic curve (not shown) of the cascade filter made up of filter sections having characteristic curves 30 and 32 will, of course, be the product of these curves. The high-frequency side of the combination characteristic is automatically adjusted by controlling the filter whose characteristic is exemplified by curve 32. In order to provide the required adjustment possibilities in the cascaded circuit, the magnitude 34 of the low-frequency asymptote (minimum pass amplitude) of curve 32 is made adjustable as indicated by the family of dotted curves 35. It is apparent that a filter having a characteristic curve similar to 32 but with its minimum pass amplitude only slightly less than its maximum pass amplitude, as for example curve 36, will when cascaded with a filter having a response characteristic of curve 30, produce little or no effect on the combined frequency characteristic. On the other hand, a filter having the characteristic of curve 32 with a low minimum pass amplitude, such as 34, will have a profound effect on the high-frequency limb of the response characteristic of the cascaded combination. Accordingly, in this invention the slope of the high-frequency portion 26 of curve 20 (FIGURE 3) is adjusted by cascading a plurality of high-emphasis filter sections whose characteristic is similar to curve 32, said high-emphasis filters having a variety of different predetermined transition frequencies 33, identified as $f_1$, $f_2$, $f_3$, etc., each such filter section having an adjustable minimum pass amplitude 35. It is apparent that any particular one of the high-emphasis filter sections having a transition frequency 33 can be made to have negligible effect on the cascaded combination by adjusting this section to have a characteristic curve similar to curve 36, or the section can be made to have substantial effect by adjusting the section to have a characteristic curve similar to 32. It has been found that seven high-emphasis sections with different transition frequencies $f_1$, $f_2$, $f_3$, etc., each with six different minimum-pass amplitude adjustments provides sufficiently accurate adjustment for all ordinary seismic operations.

Figure 6:
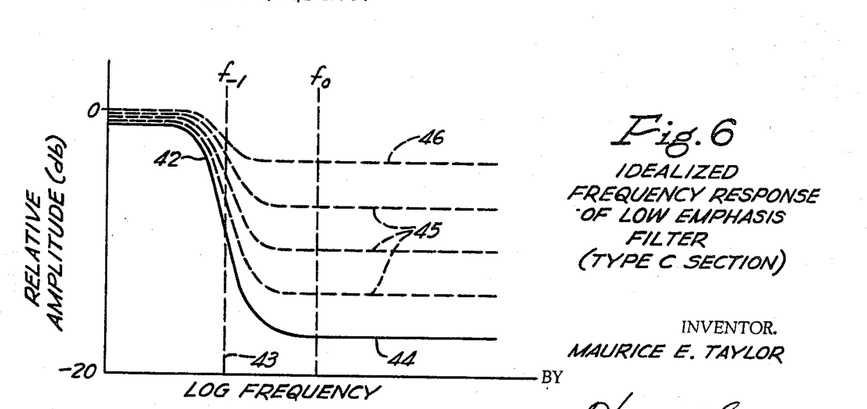
FIGURE 6 is an idealized diagram of the frequency characteristic of one of the low-emphasis filter sections employed in this invention.

Similarly in order to control the low-frequency limb 25 (FIGURE 3) of the cascaded combination of filter sections shown in FIGURE 1, the cascade includes a low-emphasis filter section having a characteristic exemplified by curve 42 of FIGURE 6, the transition frequency of the filter represented by curve 42 being at a predetermined frequency 43 identified as $f_{-1}$ (different from $f_o$). In order to provide the required adjustment possibilities in the cascaded circuit the magnitude 45 of the high-frequency asymptote (minimum pass amplitude) of curve 42 is made adjustable as indicated by the family of dotted curves in FIGURE 6. It is apparent that a filter having a characteristic curve similar to 42 but with its minimum pass amplitude only slightly less than its maximum pass amplitude, as for example curve 46, will when cascaded with a filter having a characteristic curve 30 produce little or no effect on the combined frequency characteristic. On the other hand, a filter having the characteristic of curve 42 with a low minimum pass amplitude such as 44 will have a profound effect on the low-frequency limb of the response characteristic of the cascaded combination. Accordingly, in this invention the slope of the low-frequency limb 25 of the curve 20 (FIGURE 3) is adjusted by cascading a plurality of low-emphasis filter sections whose characteristic is similar to curve 42, said low-emphasis filters having a variety of different predetermined transition frequencies 43, identified as $f_{-1}$, $f_{-2}$, $f_{-3}$, etc., and each having an adjustable minimum pass amplitude 45. It is apparent that any particular one of the low-emphasis filter sections having a transition frequency 43 can be made to have negligible effect on the cascaded combination by adjusting this section to have a characteristic curve similar to curve 46, or the section can be made to have substantial effect by adjusting the section to have a characteristic curve similar to 42. It has been found that three low-emphasis sections with different transition frequencies $f_1$, $f_2$, $f_3$, each with six different minimum-pass amplitude adjustments provide sufficiently accurate adjustment for all ordinary seismic operations. The characteristic curve of the total cascaded combination will be the product of all three (types A, B, and C) individual characteristic curves (30, 32, and 42), and can be made to approach curve 20 of FIGURE 3 very closely.

The method of which this invention provides automatic control of the various filter sections 1 to 8 (FIGURE 1) will now be evident. The type A filter sections are continuously adjusted to make their common dominant frequency $f_o$ coincide with the frequency 22 by means of frequency control unit 11. The high-frequency limb 26 of the desired inverse filter curve is obtained by making the type B high-emphasis section having the appropriate transition frequency $f_1$, $f_2$, $f_3$, etc., effective by switching it to have a low minimum pass amplitude, while those high-emphasis sections that are not desired to be effective are switched to have a high minimum-pass amplitude. The low-frequency limb 25 of the desired inverse filter curve 20 is obtained by making the type C low-emphasis section having the appropriate cutoff frequency $f_{-1}$, $f_{-2}$, $f_{-3}$, etc., effective by switching it to have a low minimum-pass amplitude, while those low-emphasis sections that are not tude, while those low-emphasis sections that are not desired to be effective are switched to have a high minimum-pass amplitude. The switching is done by the minimum-pass controls 13 to 18 of FIGURE 1 under continuous control of frequency analyzer 19 as will be described in detail later.

Figure 5:
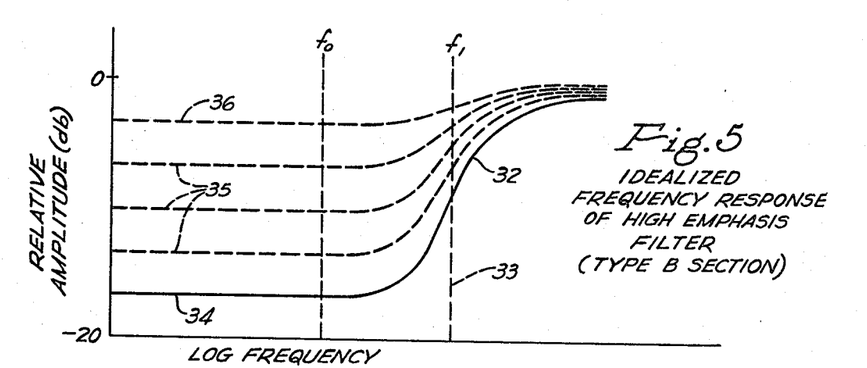
FIGURE 5 is an idealized diagram of the frequency characteristic of one of the high-emphasis filter sections employed in this invention.

The curves of FIGURES 5 and 6 are highly idealized in order to illustrate the principles of the invention. Practical considerations limit the actual response curves exemplified in FIGURES 5 and 6 to families of curves generally similar to those shown, but in which complete independence of the transition frequencies and the minimum-pass amplitude may not be achieved. Such complete independence is not essential for successful operation of the invention, and it will suffice if there is provided a plurality of high-emphasis sections and a plurality of low-emphasis sections, each plurality comprising members with a variety of different transition frequencies covering the range of interest and a variety of minimum-pass amplitudes over a sufficient amplitude range to be effective in changing the slope of the response curve for the cascaded combination. Examples of actual type B and type C filter section response curves will be referred to later. On the other hand the type A filter sections easily provide substantially the idealized response curve shown in FIGURE 4.

In both the high-emphasis filter sections whose response characteristics are similar to curve 32 of FIGURE 5, and in the low-emphasis filter sections whose characteristics are similar to curve 42 of FIGURE 6, the minimum-pass amplitude is switched by automatically changing the resistance of a resistive component in the respective filter circuits, the necessary resistance change being determined from a circuit which analyzes the frequency content of the signal. A further consideration is that each of the cascaded filter sections represented by the curves 30, 32, and 42 is designed to be a minimum phase correction type of filter for the frequency range of interest, whereupon the cascaded system will also have a minimum phase correction over the operating frequency range. This is an important characteristic of the system of this invention. The minimum phase correction property is not characteristic of many complex filter systems such as are necessary for inverse filtering, but the inverse filter of this invention has this important and desirable property.

Figure 7:
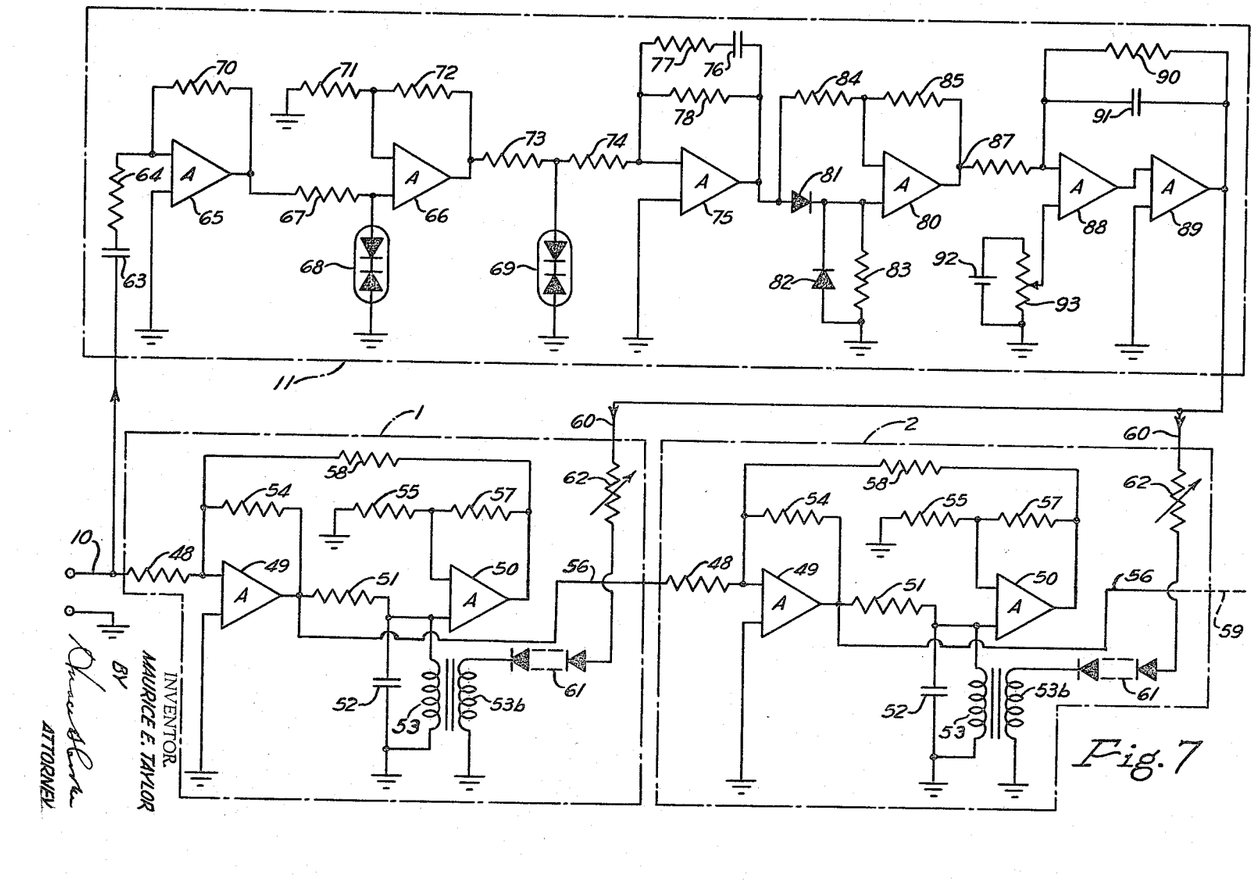
FIGURE 7 is a schematic wiring diagram of the band-absorption filter and its frequency determining and control network as employed in this invention.
Figure 9:
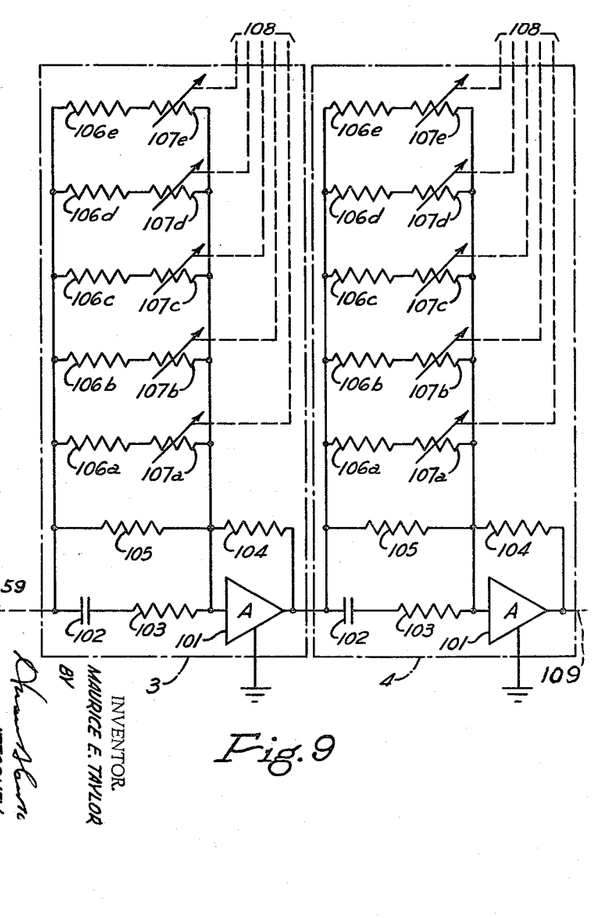
FIGURE 9 is a schematic wiring diagram of the high-emphasis filter section employed in this invention.
Figure 10:
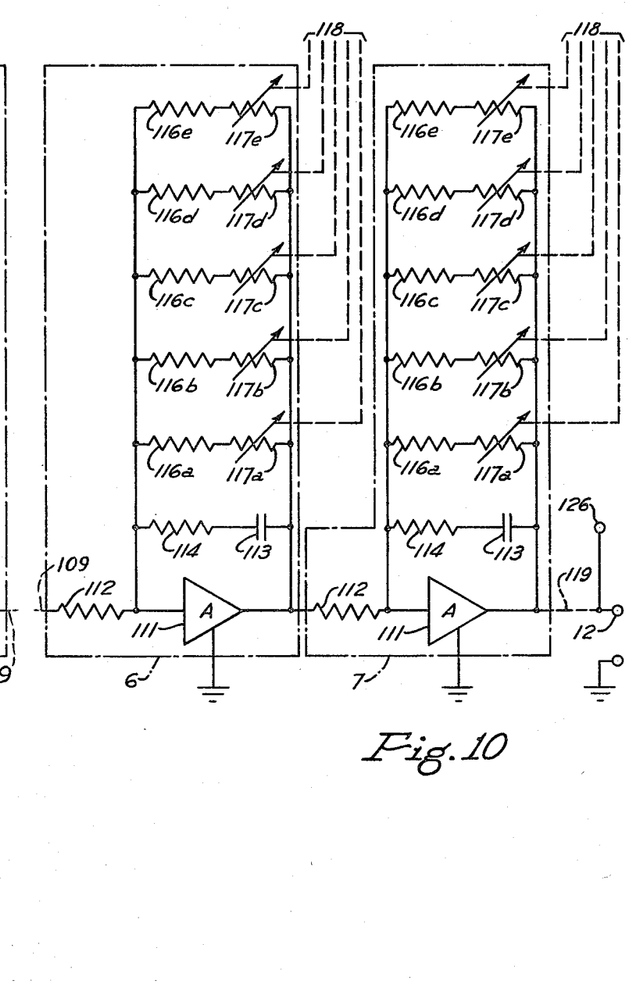
FIGURE 10 is a schematic wiring diagram of the low-emphasis filter section employed in this invention.

FIGURES 7, 9, and 10 show schematic wiring diagrams of the respective cascaded types A, B, and C filter circuits employed in the inverse filter of this invention. As previously indicated, each of the filters A, B, and C may comprise a plurality of filter sections. Each filter section comprises one or more operational amplifiers each of which has an appropriate feedback connection to provide the desired characteristic. Inasmuch as the peak amplification of each operational amplifier network is substantially unity, there will be substantially no overall attenuation through the system and the only attenuation will be that essential to obtain the filter characteristic desired. Furthermore, since each of the filter circuits is of a minimum phase correction type, there will result only minimum phase displacement for operating frequencies transmitted through the cascaded system. A substantial number of operational amplifiers is employed, but this is of minor consequence since the equipment is designed for a central office processing facility, and modern solid-state operational amplifiers are very small, require only small amounts of power, and are relatively inexpensive. FIGURE 7 shows the circuit of two type A band-absorption filter sections and their dominant frequency control circuit. FIGURE 9 shows the circuit of two type B high-emphasis filter sections having different transition frequencies and the manner of controlling their minimum pass amplitudes. FIGURE 10 shows the circuit of two type C low-emphasis filter sections having different transition frequencies, and the manner of controlling their minimum pass amplitudes. The input signal is applied at terminal 10 (FIGURE 7) and is transmitted through the filters in cascade to output terminal 12 (FIGURE 9), the return being to ground in each case as indicated.

In FIGURE 7 the elements inside the dotted outlines 1 and 2 are two typical type A filter sections proper, and the elements in the dotted outline 11 comprise the frequency-control unit for filter sections 1 and 2. Since filter sections 1 and 2 are identical, the same numerals are used to identify like elements. The frequency characteristic of the cascaded group A filter sections is that indicated in FIGURE 4 by curve 30. FIGURE 7 shows two cascaded type A filter sections whose combination has the characteristic 30, but it is apparent that additional such filter sections may be cascaded if it is desired to attain a narrower absorption band in the type A portion of the system. Input signal is applied at terminal 10 with return to ground as indicated. Each type A filter section (1 and 2 of FIGURE 1) comprises two operational amplifiers 49 and 50, having in the coupling circuit between them resistor 51, condenser 52, and inductor 53 connected as shown in FIGURE 7. Inductor 53 is of the saturable-core variable-inductance type whose inductance is controlled in a manner to be described. The frequency-determining network 11 to be described in detail later controls the inductances 53. Output from the filter section 1 is transmitted by lead 56 to filter section 2. The network of amplifiers 49 and 50 provides a band-absorption type of frequency characteristic. The circuit of amplifier 49 has input resistor 48 and feedback resistor 54. The gain of amplifier 50 is fixed by resistor 55 in the negative side of its input with feedback resistor 57. Amplifier 50 provides frequency-dependent feedback to the input of amplifiers 49 and resistor 58 determines the amount of feedback. The shape of the type A filter characteristic, and the dominant frequency $f_o$ of each of filter sections 1 and 2, are determined by the value of elements 51, 52, and 53. The dominant frequency $f_o$ of each of the filter sections 1 and 2 is controlled by a D.-C. control signal and applied at terminal 60. Elements 51, 52, and 53 are designed so that the network of amplifiers 49 and 50 will provide the broadest absorption band desired, i.e. one that matches the broadest earth filter (21 of FIGURE 2) expected. In the event that additional type A filter sections similar to 1 and 2 are cascaded, the output signal from lead 59 is transmitted through as many such filter sections as necessary in order to attain the desired sharpness of the absorption band.

The inductance 53 is a saturable-core device whose inductance may be controlled by means of direct current in a control coil $53b$ that is wound on the same core as inductance 53. Such devices are well known in the seismic prospecting art and are described, for example, in United States Patents 2,867,779, 2,911,600, and 2,952,933. The control coil $53b$ has one terminal grounded as indicated and the other terminal is supplied with direct current from lead 60 through a nonlinear device 61 and adjustable resistor 62 whose functions will become evident later.

The filter control circuit 11 comprises a network including a number of operational amplifiers that are connected in conventional circuits required to perform the necessary functions to develop at terminal 60 the appropriate D.-C. control current. The control current has its largest value when it is desired that the inductance 53 have a low value so as to provide a high dominant frequency $f_o$ on the curve. The circuits of operational amplifiers 65 and 66 are clipper circuits. The input to amplifier 65 is connected to the incoming seismic signal (terminal 10) through blocking condenser 63 and input resistor 64. The positive input terminal of amplifier 65 is grounded as shown, and the negative input circuit contains feedback resistor 70. The output circuit is provided with load resistor 67 connected to ground through a pair of Zener diodes 68 in back-to-back connection as indicated. The junction of elements 67 and 68 is connected to the positive input terminal of amplifier 66. The circuit of amplifier 65 performs an amplifying and clipping function which is further developed in the circuit of amplifier 66. The negative input terminal of amplifier 66 has resistors 71 and 72 which serve to fix the gain, and the output circuit of amplifier 66 is provided with Zener diodes 69 in a back-to-back connection as indicated. The signal at the junction of elements 73 and 69 is a substantially rectangular wave form whose zero crossings coincide with the zero crossings of the seismic signal applied to terminal 10.

Operational amplifier 75 has its positive input terminal grounded as shown, and its negative input circuit is connected through resistor 74 to the junction of elements 73 and 69. In the feedback circuit of amplifier 75 the condenser 76, resistor 77, and resistor 78 provide a limited degree of integration in the frequency region of interest, namely, from about 10 to 70 c.p.s. Operational amplifier 80, together with rectifiers 81 and 82 connected in its input circuit as shown, provides full-wave rectification of the integrated signal, so that the voltage at point 87 represents the absolute value of the integrations performed by the circuit of amplifier 75. The gain of amplifier 80 is fixed by resistors 84 and 85. The signal at junction 87 is substantially D.-C. and is positive with respect to ground.

In order to provide smooth D.-C. of sufficient power to control the variable inductors 53 in the filter sections 1 and 2, a smoothing and driving circuit comprising operational amplifiers 88 and 89 is provided. Amplifier 89 serves as a current booster. The feedback circuit of these amplifiers comprises resistor 90 and condenser 91 which provides the circuit with an integrating effect that smooths out voltage fluctuations. The time constant of the circuit comprising resistor 90 and condenser 91 is adjusted to a suitable value which for seismic operation is in the neighborhood of .03 to 0.3 second. The positive input terminal of amplifier 88 is connected to ground through a D.-C. bias circuit comprising battery 92 and potentiometer 93. The circuit of amplifiers 88 and 89 supplies current to a plurality of control coils such as 53b and accordingly is designed to have a low output impedance, for example in the order of ½ ohm.

Figure 8:
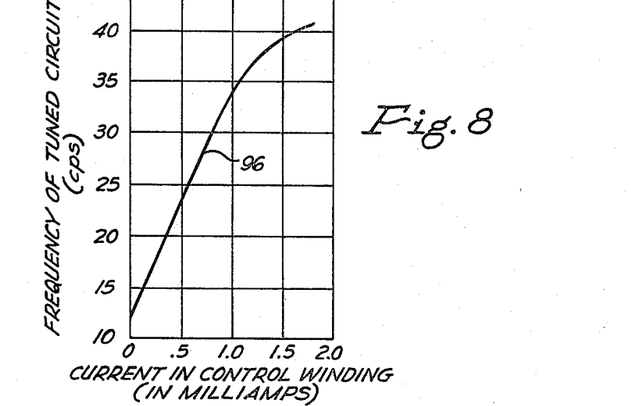
FIGURE 8 is a graph showing the relationship between control current and dominant frequency for the band-absorption filter employed in this invention.

A typical curve that relates current in the control coil 53b to the dominant frequency $f_o$ of the type A filter section is illustrated in FIGURE 8. It is apparent from curve 96 that a large current in the control coil 53b is required to produce a high dominant frequency $f_o$ for the section. The curve 96 is not a straight line, and in order for the filter section to properly "track" the frequency of the input signal at terminal 10, the current supplied by control unit 11 for any given input frequency must vary with frequency in an inverse manner from that of curve 96. This is accomplished by means of the non-linear device 61 and the resistor 62 in series with the control coil 53b. The intercept adjustment is facilitated by means of the potentiometer 93. It has been found that by using for element 161 a plurality of rectifiers one may obtain sufficiently accurate frequency tracking for all practical purposes. Tracking can be tested by disconnecting the input of control unit 11 from terminal 10, and applying a signal from an adjustable frequency oscillator (not shown) to the input of control unit 11. A separate adjustable frequency test signal is applied to the input terminal 10. For proper tracking the control unit 11 should provide a current in each lead 60 that will cause the dominant frequency $f_o$ of each type A filter section (1 and 2) to be the same as the frequency of the signal supplied to control unit 11. Good tracking can be obtained by the adjustment of elements 93, 61, and 62.

FIGURE 9 shows a detailed wiring diagram of two type B high-emphasis filter sections respectively indicated inside the dotted outlines 3 and 4. Two such type B filter sections are shown, but a larger number may be employed as required and it has been found that seven such high-emphasis sections give satisfactory results in seismic operations. All of the type B sections are similar and the same reference numerals indicate similar elements in each section. However, each type B filter section has a different preassigned transition frequency $f_1$, $f_2$, $f_3$, etc. and this requires different values for some of the components as will be understood by those skilled in the art. Each type B filter section comprises an operational amplifier 101 having in its input circuit a condenser 102 and resistor 103. The amplifier 101 has a feedback resistor 104, and each section has a frequency characteristic similar to curve 32 of FIGURE 5. In each type B section, condenser 102 and resistor 103 are paralleled by a resistor 105 whose value determines the low-frequency asymptote or minimum-pass amplitude 35 of FIGURE 5. Paralleling the resistor 105 are a plurality of resistors 106a, 106b, 106c, 106d, and 106e, each of which has in series therewith an element 107a, 107b, 107c, 107d, and 107e, respectively. Each of the elements 107 is in the nature of a switch, though actually it is a device whose resistance may be varied from a high value to a low value and vice versa in a manner to be described. It is apparent that by controlling one or more of the elements 107 to have a low resistance there is effectively brought into the circuit one or more of the resistors 106, whereby the minimum-pass amplitude of the filter section will be increased, the maximum value being indicated by 36 in FIGURE 5. The manner in which the elements 107 are controlled will be described in detail later. Each type B filter section has a different preassigned transition frequency $f_1$, $f_2$, $f_3$, etc., and by means of the elements 107 the minimum-pass amplitude of each can be varied stepwise. Each of the leads 108 is provided by the control system to be described with an appropriate electrical signal that will produce in the associated device 107 either a low resistance or a high resistance so that the device 107 acts either as a closed switch or as an open switch. Thus each of the type B sections with a different transition frequency can be made to contribute little or much to the high-frequency limb 38 of the combined characteristic curve. The output signal from the type B filter is taken from lead 109.

FIGURE 10 shows a detailed wiring diagram of two type C low-emphasis filter sections respectively indicated inside the dotted outlines 6 and 7. Two such type C filter sections are shown, but a larger number may be employed as required and it has been found that three such low-emphasis sections give satisfactory results for seismic operations. All of the type C sections are similar and the same reference numerals indicate similar elements in each section. However, each type C filter section has a different preassigned transition frequency $f_{-1}$, $f_{-2}$, $f_{-3}$, etc., thus requiring different values for some of the components as will be understood. Each type C section comprises an operational amplifier 111 connected as shown with a resistance 112 in its input circuit. The feedback circuit around amplifier 111 comprises condenser 113 and resistor 114. The resistor 114 and condenser 113 are paralleled by a plurality of resistors 116a, 116b, 116c, 116d, and 116e, each of which has in series therewith an element 117a, 117b, 117c, 117d, and 117e, respectively. The elements 117 are of the same nature as the previously mentioned elements 107 employed in the type B filters, and provide a means for effectively switching in circuit as desired one or more of th rsistors 116. Th output from the type C filter sections is obtained at lead 119. Each filter section comprising elements 111 to 117 has a response curve similar to curve 42 of FIGURE 6 with the minimum-pass amplitude 45 controlled by means of the elements 117. It is apparent that the effect of any type C filter section on the overall frequency characteristic of the system will be determined by which of the respective elements 117 of the various filters is either substantially closed or substantially open. Thus, if the low-frequency limb 25 of the desired characteristic curve 20 (FIGURE 3) does not require the use of one of the filter sections of group C, all of its elements 117 will be closed, whereupon the characteristic of that particular section will be similar to curve 46 of FIGURE 6 and this section will have substantially no effect on the overall filter characteristic of the system. On the other hand if one of the type C filter sections is required to provide the necessary shape for the low-frequency limb 25 of the overall frequency characteristic, many or all of the elements 117 of that section will be controlled to be open, whereupon this section will have a characteristic similar to 42 of FIGURE 6 and will have a material effect on the overall frequency characteristic of the system.

The output signal from the cascaded filter system is taken at terminal 12 whose return is grounded as indicated. It is apparent that a seismic signal applied at terminal 10 (FIGURE 7) will be filtered in cascade through the respective sections of types A, B, and C, and will be delivered at terminal 12. If the respective elements 53b, 107, and 117 are properly controlled, the cascaded filter system between terminals 10 and 12 will be the desired inverse filter whose characteristic is represented by curve 20 of FIGURE 3. The manner in which element 53 of the type A filter sections is controlled has already been described, and the manner in which the respective controllable elements 107 and 117 are controlled will now be described.

As previously indicated, each of the elements 107a–e and 117a–e in each of the pluralities of high-emphasis and low-emphasis sections represents a control point for the type B and type C sections respectively. Control is accomplished by causing the appropriate elements 107a–e and/or 117a–e to have either a high resistance whereby the particular resistor 106 or 116 is effectively disconnected, or by causing the element 107 or 117 to have a low resistance whereby the particular resistor 106 or 116 is effectively in circuit. In order to obtain a control signal for the respective elements 107 and 117, the output signal is sampled at output terminal 12 and a frequency analysis is made from which a plurality of control signals are generated which are respectively applied to the elements 107 and 117. When it is desired to raise the minimum-pass amplitude of any particular type B or type C filter section, a control system diagrammatically illustrated in FIGURE 11 generates an appropriate signal to lower the resistance of the appropriate elements 107 and 117 thereby switching in the corresponding resistor 106 or 116 and thereby raising the minimum-pass amplitude of the section in the manner previously described. Such filter section then contributes very little to the overall characteristic. On the other hand, in order that a particular filter section shall substantially affect the overall characteristic, the appropriate elements 107 or 117 are controlled to have a high resistance.

Figure 11:
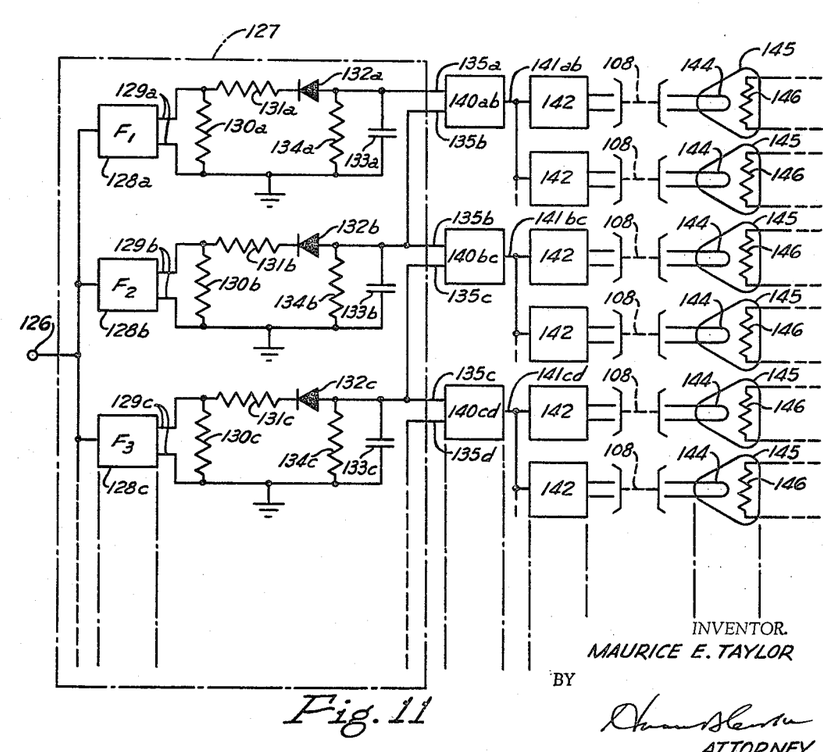
FIGURE 11 is a block diagram of the frequency analyzer and control system employed to control the high-emphasis and the low-emphasis filter sections employed in this invention.
Figure 12:
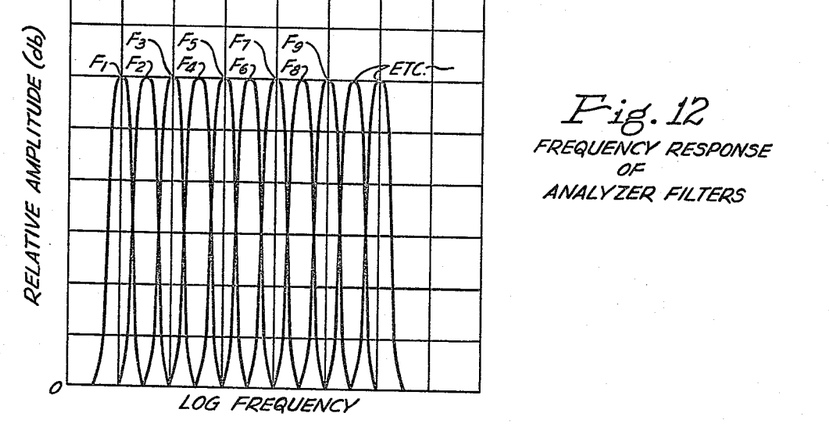
FIGURE 12 is a graph showing the frequency response of the filter elements of the frequency analyzer of this invention.

An example of a control circuit that may be used for this purpose is illustrated in FIGURE 11. The signal from terminal 12 is applied to terminal 126 (also shown on FIGURE 10) and is applied to a frequency-analyzing network 127 indicated by the dashed outline 127. The frequency-analyzing network 127 comprises a plurality of parallel connected sharply tuned band-pass filters 128a, 128b, 128c, etc., each having a different mid-frequency such as $F_1$, $F_2$, $F_3$, etc. FIGURE 12 is a graph showing the frequency response curves of the respective filters 128 that make up the frequency analyzer 127. Each of the filters 128 are of the conventional band-pass type and they preferably have adjacent or slightly overlapping frequency bands. The respective pass bands are quite narrow and a large number of filters 128 is provided to cover the entire frequency range of interest. By way of example in seismograph operations twenty-five such filters 128 may be employed to cover a frequency range of from about 5 to 70 c.p.s. Each filter 128 has a load resistor 130.

The band-pass filters 128 produce at their respective output terminals 129a, 129b, 129c, etc. an A.-C. signal whose amplitude is proportional to the particular frequency content of the signal applied to terminal 126. The output of each filter 128 is rectified by means of a circuit comprising resistor 131 and rectifier 132. The rectified output is smoothed by means of condenser 133 and resistor 134, so that at the terminals 135 there is produced a D.-C. potential with respect to ground that is substantially proportional to the amplitude of the particular frequency component F covered by the particular filter 128. It is apparent that there will be such a D.-C. voltage generated for each frequency component F in the frequency band of interest as spanned by the plurality of filters 128.

The D.-C. signals representing the amplitudes of adjacent frequency components, as for example $F_1$ and $F_2$ are compared by connecting the respective leads 135a and 135b to an amplitude comparator 140ab to be described in detail later. Comparison is made between adjacent frequency bands by employing a plurality of comparator circuits 140, the number of comparators being one less than the number of filters 128. The comparators are identified as 140ab, 140bc, 140cd, etc. according to the frequency channels a, b, c, d, etc. whose signals are compared. The comparator circuits 140 are of such form that if, for example $F_1$ amplitude is larger than $F_2$ amplitude, the comparator produces a voltage less than a preassigned threshold, whereas if the amplitude of $F_2$ component exceeds the amplitude of $F_1$ component the voltage generated by the comparator is more than the threshold. The output signal of each comparator is delivered via its lead 141 to a plurality of trigger circuits 142 which will be described in detail later. Each trigger circuit 142 is of a type that if the voltage from the comparator 141 is below the preassigned threshold, the trigger 142 has zero output; whereas if the output voltage of comparator 141 exceeds the threshold, the trigger 142 will have a substantial D.-C. output. The output of the trigger 142 is sufficiently large to illuminate a lamp filament connected thereto and indicated by 144. The lamp filament is contained in a device 145. The device 145 also contains a resistor 146 that is made of photoconductive material. The filament 144 and the photoconductive resistor 146 are sealed into a common envelope indicated in FIGURE 11 by 145. The device 145 is commercially available under the trade name "Raysistor" made by Raytheon Company of Lexington, Massachusetts, U.S.A. The characteristics of Raysistor 145 are such that when the filament 144 is energized and its light falls on the resistor 146 becomes very low. On the other hand when the filament 144 is not energized, the resistance 146 has a very high value. Each filament 144 is energized by its own trigger circuit 142, and a number of triggers 142 are actuated from a common comparator 140.

Accordingly, the circuits 140 and 142 are so arranged that when the D-C voltage on one input lead (say 135a) exceeds that on the other input lead (say 135b), the filaments 144 connected thereto are energized, whereas when the situation is reversed, the filaments 144 are not energized. The circuits are connected via leads 108 (FIGURE 9) and 118 (FIGURE 10) so that the resistors 146 of FIGURE 11 actually comprise the resistors 107 and 117 of FIGURES 9 and 10, so that energization of the filament 144 will cause the previously mentioned resistor 106 (FIGURE 9) or 116 (FIGURE 10) to be in circuit. By this means the minimum-pass amplitude 35 or 45 of FIGURES 5 and 6 is automatically adjusted for the respective type B and type C filter sections. The phasing is such that if the high-frequency limb 26 (FIGURE 3) of the overall frequency characteristic 20 is to be made less steep, the particular filaments 144 are energized that raise the minimum-pass amplitude of one or more of the high-emphasis (type B) filter sections. On the other hand at the low frequency end, the phasing is such that if the low-frequency limb 25 of the overall frequency characteristic 20 is to be made less steep, the particular filaments 144 are energized that raise the minimum-pass amplitude of one or more of the low-frequency (type C) filter sections. A time constant is built into the system through the resistors 705, 706, 709, and condenser 708, and this time constant may for seismic operations be of the order of 200 milliseconds. Any flutter that may occur in the automatic adjustment of the system is not objectionable. The use of the Raysistor 145 avoids sharp transient effects because these elements have a "soft" approach. They also provide complete isolation of their input and output signals thereby eliminating any possibility of unwanted signal feedback.

As previously indicated, it has been found that for seismic operations a total of seven type B filter sections is satisfactory. Each of the type B filter sections has five resistances 146 forming the elements 107 of FIGURE 9, thus providing six steps of minimum pass amplitude for each of the transition frequencies of the respective type B filter sections. Accordingly, there will be thirty-five trigger circuits 142 actuating the thirty-five filaments 144 which (via the leads 108) control the elements 107 in FIGURE 9. Similarly it has been found that a total of three type C filter sections is satisfactory for seismic operation, each section having five resistors 146 forming the elements 117 of FIGURE 10, so that there will be fifteen trigger circuits 142 actuating the fifteen filaments 144 that (via the leads 118) control the elements 117 in FIGURE 10. It is apparent that some of the comparators 140 work on the low-frequency limb 25 of the curve 20 (FIGURE 3) and some of the comparators 140 work on the high-frequency limb 26 of the curve 20. The comparators are assigned to the respective elements 107 and 117 so as to control the frequency analysis made by the analyzer 127 (19 of FIG- URE 1) to give a nearly uniform frequency content to the output signal on terminal 12 (126).

Figure 18:
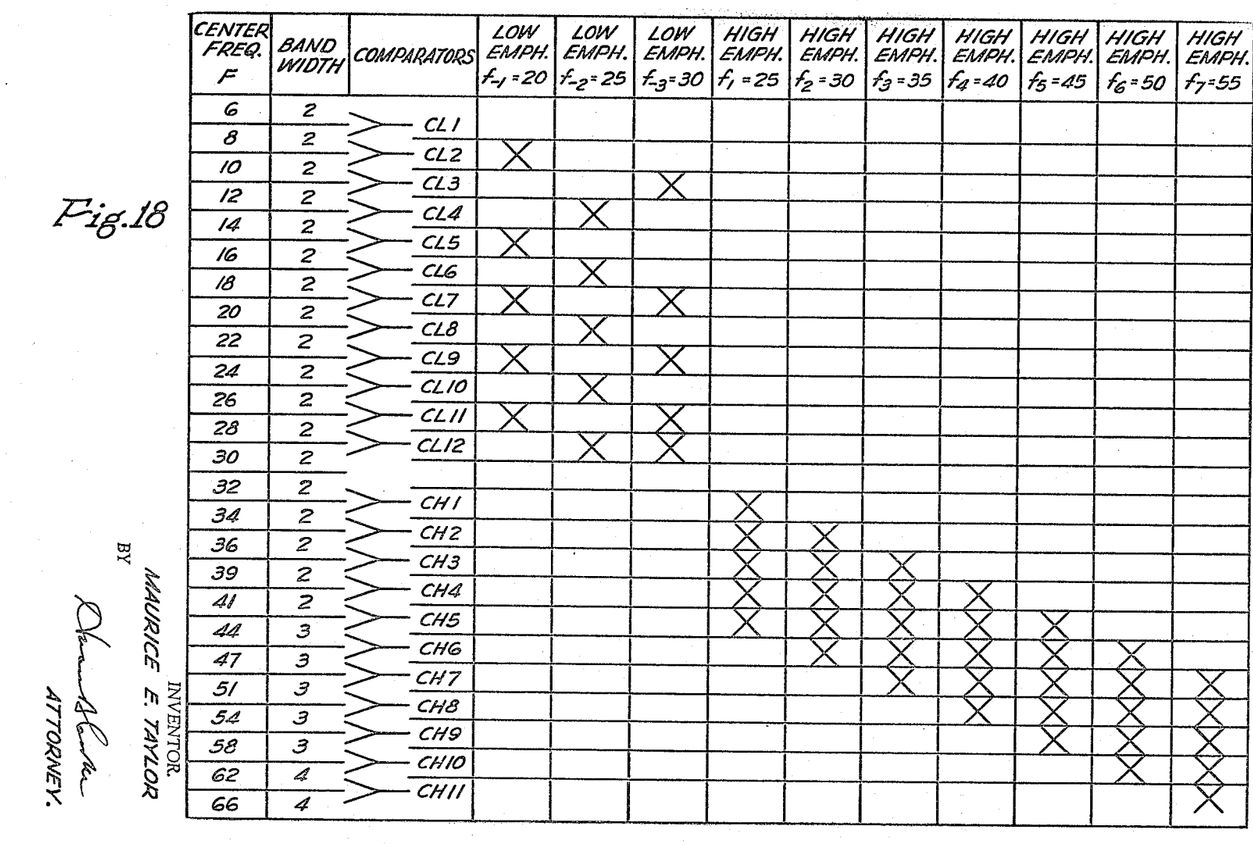
FIGURE 18 is a table indicating interconnection between the frequency comparators and the control elements of the high-emphasis and the low-emphasis filter sections of this invention.

An example of the manner in which the respective elements 107 and 117, through the respective trigger circuit 142 connected thereto, are assigned to the various comparator circuits 140 is indicated in the table of FIGURE 18. Also by way of example, FIGURE 18 lists in the first column the mid-frequencies $F_1$, $F_2$, $F_3$, etc., starting from the low-frequency end of the spectrum of band-pass filters 128 in the frequency analyzer (19 of FIGURE 1, 127 of FIGURE 11). Further, by way of example, FIGURE 18 lists in the second column the band width of each band-pass filter 128. The respective comparators are identified in the third column, and those comparators that compare amplitudes of low frequencies are identified as CL1, CL2, CL3, etc., and those comparators that compare amplitudes of high frequencies are identified as CH1, CH2, CH3, etc. A break between the low and high frequency regimes is made at about the middle of the range of variation in frequency of the type A filter, which in the case of reflection seismic operation is about 30 cps. As previously indicated, a total of three low-emphasis (type C) filter sections and seven high-emphasis (type B) filter sections, each with five switching elements 117 and 107, respectively are employed for seismic operations, although a larger or smaller number may be employed if desired. The phasing is such that in the case of the CL comparators, the lamp 144 is turned on when the lower frequency has the higher amplitude. In the case of the CH comparators the lamp 144 is turned on when the higher frequency has the higher amplitude. In the table of FIGURE 18 the respective switching element 107 or 117 is indicated as being closed (i.e. filament 144 on) where an X appears in the filter column to the right of the respective comparator. The X designates the switching element that is closed (i.e. filament on) by the comparator for the particular filter section referenced at the top of each of the ten columns to the right of the comparator column. It is apparent that the particular assignment shown in FIGURE 18 requires fifty trigger circuits 142 to actuate the respective filaments at the X points.

By way of example specific examples of elements 128, 140, and 142 will now be described.

Figure 13:
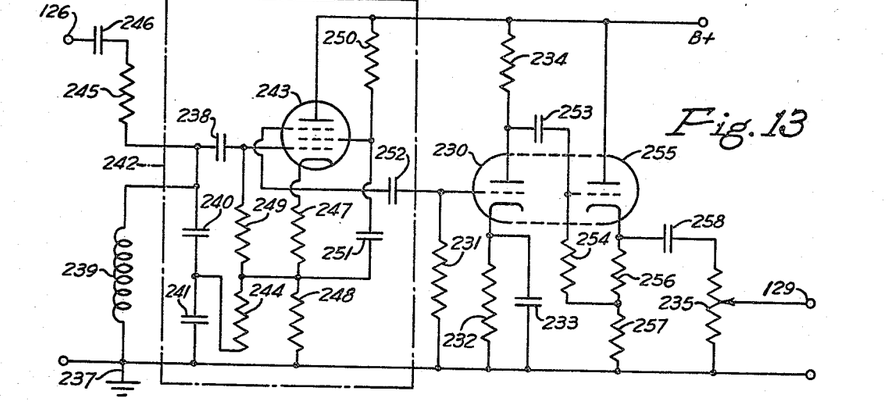
FIGURE 13 is a schematic wiring diagram of a narrow band-pass filter employed in the frequency analyzer of this invention.

The narrow band-pass filters 128 may be of any well-known type, and by way of example a high-Q resonant type of filter is shown in detail in FIGURE 13. The filter comprises a tube 230 having a conventional grid resistor 231, cathode resistor 232 with bypass condenser 233, and plate resistor 234. The tank circuit of the filter system comprises inductance 239 with condensers 240 and 241 connected as shown, and the values of the inductance and condensers are chosen to peak the filter at the desired frequency $F_1$, $F_2$, $F_3$, etc. In order to increase the Q-value of the resonant tank circuit there is connected to it a conventional Q-multiplier network made up of elements inside the dotted outline 242. The Q-multiplier comprises pentode tube 243 connected as indicated. A resistor 244 is connected to the junction of condensers 240 and 241 and connects to the junction of resistors 247 and 248 in the cathode circuit of tube 243. Resistor 249 serves as a grid resistor. Proper screen voltage is obtained through resistor 250 which has bypass condenser 251. The effect of the network 242 is to increase the Q value of the resonating tank circuit comprising inductance 239 and condensers 240 and 241, and the particular value of Q obtained depends on the resistance values of resistors 244 and 245. Accordingly, the resistors 244 and 245 are chosen for each filter so that the band width of the filter channels 128a, 128b, 128c, etc. have the desired value as shown in FIGURE 18. The tank circuit and its Q-multiplier is coupled to tube 230 by means of condenser 252.

The output of tube 230 is transmitted through coupling condenser 253 to a cathode-follower stage with tube 255 having grid resistor 254 and cathode resistors 256 and 257.

The output signal is transmitted through coupling condenser 258 to a potentiometer 235, whose slider is connected to terminal 129. The input signal to the filter is applied to terminal 126 and is transmitted to the tank circuit through condenser 246 and resistor 245, the other side of the input being grounded as shown at 237. The purpose of potentiometer 235 is to permit adjusting the various filters 128 to equal gain up to the terminal 129. Tubes 230 and 255 shown as triodes may be in a common envelope. Heater circuits and B+ supply are conventional and are not shown in the figure.

By means of the circuit illustrated in FIGURE 13 a very narrow pass band may be obtained. It is preferred that the pass bands of the respective channels $F_1$, $F_2$, $F_3$, etc., be of substantially equal width as measured in c.p.s. In the application of the invention to the analysis of reflection seismograms it has been found desirable to use a large number of filter channels, the width of the pass bands being in the order of two to five cycles per second as measured at the 3 db point. A pass band whose width is in this range is easily obtained by means of the high-Q resonant filter circuit as shown in FIGURE 13. In the high-Q resonant filter circuit of FIGURE 13 the values of inductance 239 and condensers 240 and 241 are chosen in well-known manner so that the peak frequency of the particular filters 128a, 128b, 128c, etc. have the desired value $F_1$, $F_2$, $F_3$, etc., shown in FIGURE 18. It has been further found desirable to space the pass bands of the respective filters 128 so that they are distributed over the range of frequencies of interest with slight overlap as indicated in FIGURE 12. A logarithmic frequency distribution is preferred for the reason that the high Q filters having constant frequency band width at the 3 db point have increasing frequency width at the 6 db point, and in order to prevent excessive overlap the bands are given increased spacing at the higher frequencies. While a vacuum-tube type of circuit for elements 128 has been described, it is apparent that these elements may comprise transistor circuits having substantially the same frequency characteristics.

Figure 14:
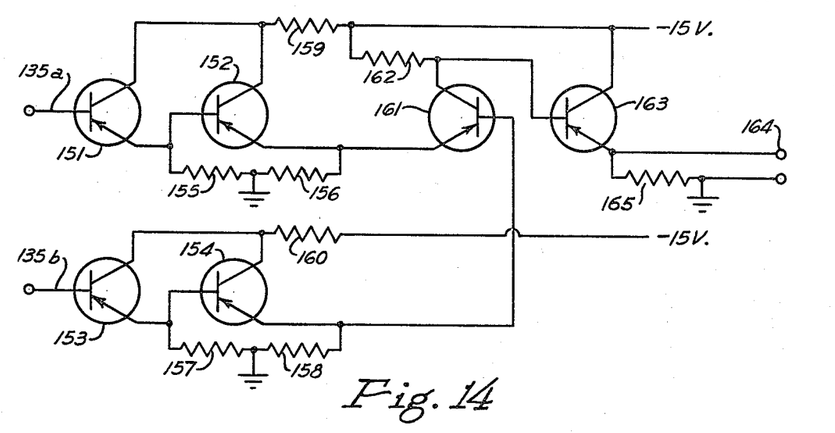
FIGURE 14 is a schematic wiring diagram of a comparator such as is employed in this invention.

FIGURE 14 shows a schematic wiring diagram of one of the comparators 140 of FIGURE 11. The two D.-C. input voltages to be compared are applied on leads 135a and 135b, each having its return to ground (not shown). The two input voltages are each first fed into a pair of well-known Darlington-type emitter-follower circuits comprising transistors 151, 152, and 153, 154, respectively connected as indicated. The collectors of transistors 151 and 152 are connected together and to negative 15-volt supply through resistor 159, and the collectors of transistors 153 and 154 are connected together and to negative 15-volt supply through resistor 160. Transistor 161 actually performs the comparison of the two signals, the output of transistor 152 being connected to the emitter of transistor 161, and the output of transistor 154 being connected to the base of transistor 154. The collector of transistor 161 is connected to negative 15-volt supply through load resistor 162. The output of the circuit of transistor 161 is fed to a simple emitter-follower stage comprising transistor 163 connected as shown. The purpose of transistor 163 is merely to isolate the succeeding circuits from the comparator stage 161. The output across resistor 165 of the comparator circuit of FIGURE 14 is such that if input signal on 135a is larger in magnitude than input signal on 135b, a potential of −15 v. appears on output lead 164; but if the signal on 135b is larger than on 135a then zero voltage appears on lead 164. The comparators 140 (FIGURE 11) thus develop a −15 v. signal or zero signal dependent on whether the signal impressed on terminal 126 contains a larger or smaller amplitude of adjacent frequencies $F_1$, $F_2$, $F_3$, etc. In effect, the comparators 140 serve to detect the slope of the frequency-content curve of the signal impressed on terminal 126, which from FIGURE 10 is seen to be the output signal of the inverse filter system. The comparators 140 eventually control the appropriate filaments 144 of devices 145 (FIGURE 11) and are connected so as to flatten the frequency spectrum of the signal at terminal 126, i.e. the output of the inverse filter system. It is apparent that by doing so the comparators in effect cause the product of curves 21 (FIGURE 2) and 20 (FIGURE 3) to be flat, i.e. the curve 20 is in this manner adjusted to be the desired inverse of curve 21.

Figure 15:
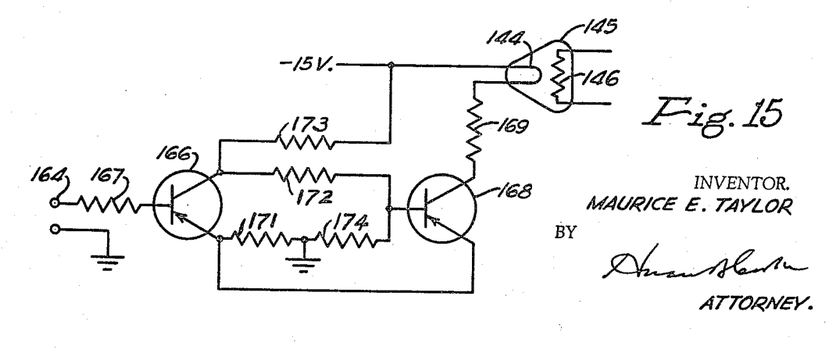
FIGURE 15 is a schematic wiring diagram of a trigger circuit such as is employed in this invention.

Each comparator may at times be required to control one or more lamp filaments 144. As previously indicated, this is accomplished by providing a trigger circuit 142 for each filament and actuating a plurality of triggers from a common comparator. FIGURE 15 is a wiring diagram of a conventional Schmitt trigger circuit that may be employed. The output signal (either zero or —15 v.) from the comparator on lead 164 is fed to the base of transistor 166 through resistor 167, other connections being made as indicated through resistors 171, 172, 173, and 174. The output transistor 168 has its collector connected to resistor 169 in series with filament 144. The trigger circuit of FIGURE 15 is such that with zero signal on lead 164 there is current through resistor 169 and the filament 144 connected thereto, i.e. the filament is energized so that the associated resistor 146 has a low value. Thus with zero signal on lead 164 the corresponding switching element 107 or 117 (FIGURES 9 and 10) is closed. On the other hand whenever —15 v. signal appears on lead 164 the filament 144 is not illuminated, and the associated resistor 146 has a high value, i.e. the corresponding switching element 107 or 117 (FIGURES 9 and 10) is open.

Operation of the frequency-control system of this invention will now be evident. The type A filter sections are continuously controlled to have a predominant frequency in accordance with the frequency sensing and control network 11 of FIGURE 7. The high-frequency limb and the low-frequency limb of the response curve are flattened by continuously automatically controlling the slope of the curve sensed by frequency analyzer of FIGURE 11, this being done by closing appropriate switches 107 and 117 in the respective type A and type B filter sections.

Figure 16:
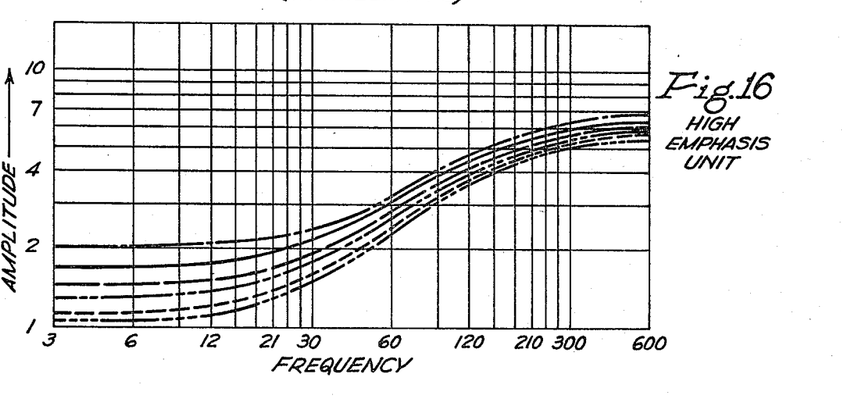
FIGURE 16 is an example of actual response curves obtained with a high-emphasis filter section employed in this invention.
Figure 17:
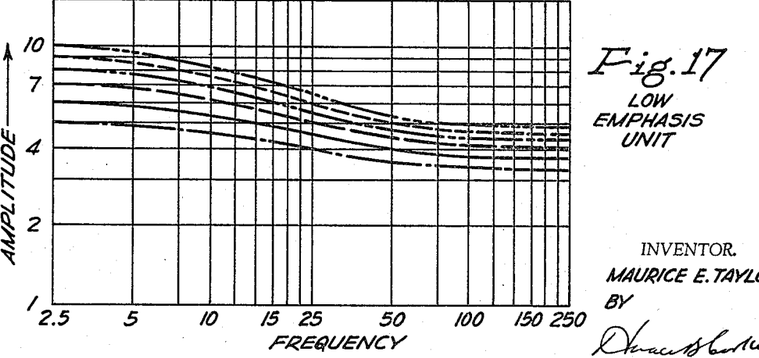
FIGURE 17 is an example of actual response curves obtained with a low-emphasis filter section employed in this invention.

As previously indicated, the curves of FIGURES 5 and 6 are idealized response curves for the type B and type C filter sections, respectively. The shape of these curves is exaggerated in FIGURES 5 and 6 for purposes of explanation and such shape is not conveniently obtained. By way of example, FIGURE 16 shows a family of actual response curves for a type B high-emphasis section whose wiring diagram is given in FIGURE 9. It is apparent that there is some shift in transition frequency $f_1$ as the minimum pass amplitude is shifted, but this is not detrimental to operation of the system and almost any such shifts can be taken into account in making the comparator assignments (FIGURE 18). Also by way of example, FIGURE 17 shows a family of actual response curves for a type C low-emphasis section whose wiring diagram is given in FIGURE 10. It has been found in practice that by employing type B and type C filter sections that have a relatively small ratio of relative response at extreme frequencies and by employing more of such sections, it is possible to automatically achieve a better inverse filter match, than by using a lesser number of more effective sections. Even though the effect of a single section is not large, the total effect available is this effect raised to a power equal to the number of such sections employed in the system. Accordingly, a section having an emphasis ratio in the neighborhood of two to one will when repeated a plurality of times have a considerable effect.

It is evident that in the preferred embodiment of the invention herein described there is employed a combination of forward-acting and backward-acting control action. Referring to FIGURE 1 it is seen that the frequency control 11 feeds in a forward direction to the band-absorption filters 1 and 2. It is further seen that the frequency analyzer 19 feeds in a backward direction to the various high-emphasis and low-emphasis filter sections 3 to 8. It will be evident to those skilled in the art that the invention may employ all forward-acting or all backward-acting controls by appropriate extension of the elements and circuitry herein described. It will also be evident that different sampling frequencies may be employed for different applications of the invention. The invention provides a method and apparatus for attaining a desired inverse filter by continuously automatically controlling the dominant frequency and continuously automatically and independently controlling the slopes of the high-frequency and the low-frequency limb of the response curve.

By way of example only and not by way of limitation, the following values of the respective component elements of this invention may be employed with satisfactory results.

| Element Number | Component | Specification |
| --- | --- | --- |
| 48 | Resistor | 10,000 ohms. |
| 49 | Operational Amplifier | Philbrick P65A. |
| 50 | do | Do. |
| 51 | Resistor | 30,000 ohms. |
| 52 | Condenser | } Selected to tune over frequency range of interest. |
| 53 | Saturable Core Inductor | |
| 54 | Resistor | 100,000 ohms. |
| 55 | do | 4,700 ohms. |
| 57 | do | 10,000 ohms. |
| 58 | do | Do. |
| 61 | Rectifier | 8 type 1N100 diodes. |
| 62 | Variable Resistor | 800 ohms. |
| 63 | Condenser | 0.25 mfd. |
| 64 | Resistor | 50,000 ohms. |
| 65 | Operational Amplifier | Philbrick K2W. |
| 66 | do | Do. |
| 67 | Resistor | 100,000 ohms. |
| 68 | Rectifiers | 2 type 650Co Zener diodes. |
| 69 | do | Do. |
| 70 | Resistor | 5 megohms. |
| 71 | do | 10,000 ohms. |
| 72 | do | 1 megohm. |
| 73 | do | 100,000 ohms. |
| 74 | do | 500,000 ohms. |
| 75 | Operational Amplifier | Philbrick K2W. |
| 76 | Condenser | 0.04 mfd. |
| 77 | Resistor | 70,000 ohms. |
| 78 | do | 500,000 ohms. |
| 80 | Operational Amplifier | Philbrick K2W. |
| 81 | Rectifier | Transitron S-158. |
| 82 | do | Do. |
| 83 | Resistor | 10 megohms. |
| 84 | do | 100,000 ohms. |
| 85 | do | Do. |
| 88 | Operational Amplifier | Philbrick K2W. |
| 89 | do | Philbrick K2B1. |
| 90 | Resistor | 500,000 ohms. |
| 91 | Condenser | 0.5 mfd. |
| 92 | Battery | 4.0 V. |
| 93 | Potentiometer | 1 megohm. |
| 101 | Operational Amplifier | Philbrick P65A. |
| 102 | Condenser | 0.3 mfd. |
| 103 | Resistor | 4,000 ohms. |
| 104 | do | 20,000 ohms. |
| 105 | do | Do. |
| 106a | do | 100,000 ohms. |
| 106b | do | Do. |
| 106c | do | Do. |
| 106d | do | Do. |
| 106e | do | Do. |
| 107a | Raysistor | Type CK1114. |
| 107b | do | Do. |
| 107c | do | Do. |
| 107d | do | Do. |
| 107e | do | Do. |
| 111 | Operational Amplifier | Philbrick P65A. |
| 112 | Resistor | 20,000 ohms. |
| 113 | Condenser | 0.4 mfd. |
| 114 | Resistor | 20,000 ohms. |
| 116a | do | 100,000 ohms. |
| 116b | do | Do. |
| 116c | do | Do. |
| 116d | do | Do. |
| 116e | do | Do. |
| 117a | Raysistor | Type CK1114. |
| 117b | do | Do. |
| 117c | do | Do. |
| 117d | do | Do. |
| 117e | do | Do. |
| 130 | Resistor | 33,000 ohms. |
| 131 | do | Do. |
| 132 | Rectifier | Type 1N100. |
| 133 | Condenser | 1 mfd. |
| 134 | Resistor | 33,000 ohms. |
| 145 | Raysistor | (See 107 and 117). |
| 151 | Transistor | Type 2N1175A. |
| 152 | do | Do. |
| 153 | do | Do. |
| 154 | do | Do. |
| 155 | Resistor | 100,000 ohms. |
| 156 | do | 82 ohms. |
| 157 | do | 100,000 ohms. |
| 158 | do | 100 ohms. |
| 159 | do | 330 ohms. |
| 160 | do | Do. |

| Element Number | Component | Specification |
|---|---|---|
| 161 | Transistor | Type 2N1175A. |
| 162 | Resistor | 100,000 ohms. |
| 163 | Transistor | Type 2N1175A. |
| 165 | Resistor | 33,000 ohms. |
| 166 | Transistor | Type 2N1175A. |
| 167 | Resistor | 15,000 ohms. |
| 168 | Transistor | Type 2N1175A. |
| 169 | Resistor | Selected as required by filament of Raysistor. |
| 171 | ---do--- | 27 ohms. |
| 172 | ---do--- | 6,800 ohms. |
| 173 | ---do--- | 1,500 ohms. |
| 174 | ---do--- | 10,000 ohms. |
| 230 | Vacuum tube | ½ 12AU7. |
| 231 | Resistor | 1 megohm. |
| 232 | ---do--- | 3,900 ohms. |
| 233 | Condenser | 10–100 mfd. (See Note*). |
| 234 | Resistor | 56,000 ohms. |
| 235 | Potentiometer | 1,000 ohms. |
| 238 | Condenser | 10 mfd. |
| 239 | Inductor | Chosen to adjust peak frequency of filter. |
| 240 | Condenser | |
| 241 | ---do--- | |
| 243 | Vacuum tube | 6AU6. |
| 244 | Resistor | Chosen to adjust Q of circuit. |
| 245 | ---do--- | |
| 246 | Condenser | Normally 1 mfd. (See Note*). |
| 247 | Resistor | 2,400 ohms. |
| 248 | ---do--- | 62,000 ohms. |
| 249 | ---do--- | 470,000 ohms. |
| 250 | ---do--- | 200,000 ohms. |
| 251 | Condenser | 2 mfd. |
| 252 | ---do--- | 1 mfd. |
| 253 | ---do--- | 1 mfd. |
| 254 | Resistor | 510,000 ohms. |
| 255 | Vacuum tube | ½ 12AU7. |
| 256 | Resistor | 1,800 ohms. |
| 257 | ---do--- | 2,200 ohms. |
| 258 | Condenser | 10–100 mfd. (See Note*). |

*Note.—The normal value of this component is that used for intermediate and high-frequency bands. However, this component is frequency dependent and must be properly chosen at the low-frequency end of the spectrum in order to allow the circuits to function properly at these low frequencies as will be evident to those skilled in the art.

In the schematic wiring diagrams all normal connections to amplifiers, including ground, are made in conventional manner and are omitted from the figures in the interest of simplification.

What I claim as my invention is:

1. An electrical signal processing method adapted to flatten the frequency spectrum of a continuously changing signal whose frequency spectrum has the form of a smooth transmission band which comprises transmitting the signal through a band-absorption filter whose frequency characteristic has a predominant absorption frequency with a low-frequency limb and an high-frequency limb, continuously measuring the frequency spectrum of the signal, continuously adjusting the predominant frequency of the band absorbed during said transmission in response to said measured spectrum, continuously adjusting the slope of the low-frequency limb of the band absorbed during said transmission in response to said measured spectrum, and continuously adjusting the slope of the high-frequency limb of the band absorbed during said transission in response to said measured spectrum.

2. In an electrical signal processing system adapted to provide inverse filtering of a previously filtered signal, the method of automatically adjusting the parameters of the inverse filter to flatten the frequency spectrum which comprises detecting the predominant frequency of the signal to be processed, controlling the predominant absorption frequency of the inverse filter in response to the detected predominant frequency, making an amplitude-frequency analysis of the processed signal, controlling the slope of the low-frequency limb of the inverse filter in response to said frequency analysis, and controlling the slope of the high-frequency limb of the inverse filter in response to said frequency analysis.

3. In an electrical signal processing system adapted to provide inverse filtering of a previously filtered signal, the method of automatically adjusting the parameters of the inverse filter to flatten the frequency spectrum which comprises detecting the predominant frequency of the signal, controlling the predominant absorption frequency of the inverse filter in response to the predominant frequency of the signal, analyzing the inverse filtered signal for the ratio of amplitude of a plurality of preselected frequency components, controlling the low-frequency limb of the inverse filter by automaticaly adjusting the minimum pass amplitude of a low-frequency emphasis filter cascaded with the band-absorption filter, controlling the high-frequency limb of the inverse filter by automatically adjusting the minimum pass amplitude of a high-frequency emphasis filter cascaded with the band-absorption filter, and controlling both of said adjustments in response to said frequency analysis.

4. A method of independently controlling the predominant frequency and the slope of the low-frequency limb and the slope of the high-frequency limb of an inverse filter employing in cascade connection a band-absorption filter, a low-frequency emphasis filter having a minimum pass amplitude in the high-frequency range, and a high-frequency emphasis filter having a minimum pass amplitude in the low-frequency range through which cascade a signal is transmitted for inverse filtering of a previously filtered electrical signal to flatten the frequency spectrum which comprises measuring the predominant frequency of the signal, controlling the predominant absorption frequency of the band-absorption filter in response to the measured frequency of the signal, measuring the relative amplitudes of a plurality of preselected frequency components of the signal, controlling the minimum pass amplitude of the low-frequency emphasis filter in response to the relative amplitudes of signal frequency components whose frequency is lower than the predominant frequency, and controlling the minimum pass amplitude of the high-frequency emphasis filter in response to the relative amplitudes of signal frequency components whose frequency is higher than the predominant frequency.

5. In a seismogram processing system, the method of automatically adjusting the parameters of an inverse filter system to provide a frequency characteristic that is the inverse of the filtering effect of the earth on a seismic impulse recorded as a seismogram which comprises detecting the predominant frequency of the seismogram, controlling the predominant frequency of the inverse filter in response to the predominant frequency of the seismogram, providing in cascade with the inverse filter a plurality of cascaded low-pass filters of different preselected cutoff frequencies and adjustable minimum pass amplitude, providing in cascade with the inverse filter a plurality of cascaded high-pass filters of different preselected cutoff frequencies and adjustable minimum pass amplitude, performing a frequency analysis of the output signal of the seismogram processing system, adjusting the low-frequency limb of the filter system by controlling the minimum pass amplitude of said low-pass filters in response to the results of said frequency analysis in such manner as to provide substantially flat frequency content of the output signal, and adjusting the high-frequency limb of the filter system by controlling the minimum pass amplitude of said high-pass filters in response to the results of said frequency analysis in such manner as to provide substantially flat frequency content of the output signal.

6. In a seismogram processing system, the method of automatically adjusting the parameters of an inverse filter system to provide a frequency characteristic that is the inverse of the filtering effect of the earth on a seismic impulse recorded as a seismogram which comprises detecting the predominant frequency of the seismogram, adjusting the predominant frequency of the inverse filter by controlling a variable impedance element therein in response to the predominant frequency of the seismogram, providing in cascade with the inverse filter a plurality of cascaded low-pass filters of different preselected cutoff frequencies and adjustable minimum pass amplitude, providing in cascade with the inverse filter a plurality of cascaded high-pass filters of different preselected cutoff frequencies and adjustable minimum pass amplitude, performing a frequency analysis of the output signal of the seismogram processing system, adjusting the low-frequency limb of the filter system by controlling the minimum pass amplitude of said low-pass filters in response to the results of said frequency analysis in such manner as to provide substantially flat frequency content of the output signal, and adjusting the high-frequency limb of the filter system by controlling the minimum pass amplitude of said high-pass filters in response to the results of said frequency analysis in such manner as to provide substantially flat frequency content of the output signal.

7. A self-adjusting electrical filter adapted to continuously flatten the frequency spectrum of a signal whose frequency spectrum has the form of a smooth transmission band which comprises a band-absorption filter whose frequency characteristic has a predominant absorption frequency and a low-frequency limb and a high-frequency limb, means connected to said band-absorption filter adapted to measure the frequency spectrum of the signal, means connected to said band-absorption filter adapted to adjust the predominant frequency thereof, means connected to said band-absorption filter controlling said predominant-frequency adjusting means in response to the output of said frequency-spectrum measuring means, means connected to said band-absorption filter adapted to adjust the slope of the low-frequency limb thereof, means connected to said band-absorption filter controlling said low-frequency slope-adjusting means in response to the output of said frequency-spectrum measuring means, means connected to said band-absorption filter adapted to adjust the slope of the high-frequency limb thereof, and means connected to said band-absorption filter controlling said high-frequency slope-adjusting means in response to the output of said frequency-spectrum measuring means.

8. Apparatus for inverse filtering of an electrical signal which comprises a band-absorption filter including electrical means for adjusting the predominant frequency of the absorption band thereof, a low-frequency emphasis filter having electrically adjustable minimum high-frequency pass amplitude, a high-frequency emphasis filter having electrically adjustable minimum low-frequency pass amplitude, an electrical network connecting said band-absorption filter and said low-frequency emphasis filter and said high-frequency emphasis filter in cascade between input terminals and output terminals, first frequency-responsive means connected to said input terminals responsive to the predominant frequency of the signal to be filtered, first control means connected to said first frequency-responsive means and to said band-absorption filter controlling the predominant frequency of the absorption band thereof in response to signal from said first frequency-responsive means, second frequency-responsive means connected to said output terminals responsive to the ratio of amplitudes of a plurality of predetermined frequency components in the signal from said output terminals, and second control means connected to said second frequency-responsive means and to said low-frequency emphasis filter and to said high-frequency emphasis filter controlling the minimum pass amplitudes thereof in response to signals from said second frequency-responsive means.

9. Apparatus for inverse filtering of an electrical signal which comprises a band-absorption filter including electrical means for adjusting the predominant frequency of the absorption band thereof, a low-frequency emphasis filter having electrically adjustable minimum high-frequency pass amplitude, a high-frequency emphasis filter having electrically adjustable minimum low-frequency pass amplitude, an electrical network connecting said band-absorption filter and said low-frequency emphasis filter and said high-frequency emphasis filter in cascade between input terminals and output terminals, first frequency-responsive means connected to said input terminals responsive to the predominant frequency of the signal to be filtered, first control means connected to said first frequency-responsive means and to said band-absorption filter controlling the predominant frequency of the absorption band thereof in response to signal from said first frequency-responsive means, second frequency-responsive means connected to said output terminals responsive to the amplitude of each of a plurality of respective frequency components in the signal from said output terminals, a plurality of amplitude comparators connected to said second frequency-responsive means and adapted to compare the amplitudes of adjacent frequency components and each producing a signal indicative of the sense of the measured comparison, and a plurality of trigger means connected to said respective comparators and to said adjustable element in said low-frequency emphasis filter and to said adjustable element in said high-frequency emphasis filter.

10. Apparatus for inverse filtering of an electrical signal which comprises a band-absorption filter including electrical means for adjusting the predominant frequency of the absorption band thereof, a low-frequency emphasis filter having electrically adjustable minimum high-frequency pass amplitude, a high-frequency emphasis filter having electrically adjustable minimum low-frequency pass amplitude, an electrical network connecting said band-absorption filter and said low-frequency emphasis filter and said high-frequency emphasis filter in cascade between input terminals and output terminals, frequency-measuring means connected to said input terminals and to said band-absorption filter controlling the predominant frequency of the absorption band thereof in response to signal from said frequency-measuring means, frequency-analyzing means connected to said output terminals measuring the amplitude of a plurality of frequency components in the signal from said output terminals, and control means connected to said frequency-analyzing means and to said minimum pass amplitude-adjusting means of said low-frequency emphasis filter and to said minimum pass amplitude-adjusting means of said high-frequency emphasis filter controlling said minimum pass amplitudes in response to signal from said frequency-analyzing means.

11. Apparatus for inverse filtering of an electrical signal which comprises a band-absorption filter including electrical means for adjusting the predominant frequency of the absorption band thereof, a plurality of low-frequency emphasis filters of different cutoff frequency and having electrically adjustable minimum high-frequency pass amplitude, a plurality of high-frequency emphasis filters of different cutoff frequency and having electrically adjustable minimum low-frequency pass amplitude, an electrical network connecting said band-absorption filter and said low-frequency emphasis filters and said high-frequency emphasis filters in cascade between input terminals and output terminals, first frequency-responsive means connected to said input terminals responsive to the predominant frequency of the signal to be filtered, first control means connected to said first frequency-responsive means and to said band-absorption filter controlling the predominant frequency of the absorption band thereof in response to signal from said first frequency-responsive means, second frequency-responsive means connected to said output terminals responsive to the ratio of amplitudes of a plurality of predetermined frequency components in the signal from said output terminals, a plurality of amplitude comparators connected to said second frequency responsive means and adapted to compare the amplitudes of adjacent frequency components and each producing a signal indicative of the sense of the measured comparison, and a plurality of trigger means connected to said respective comparators and to the respective adjustable elements in said low-frequency emphasis filters and to the respective adjustable elements in said high-frequency emphasis filters.

12. Apparatus for inverse filtering of an electrical signal which comprises a minimum phase shift band-absorption filter including electrical means for adjusting the predominant frequency of the absorption band thereof, a plurality of minimum phase shift low-frequency emphasis filters of different cutoff frequency and having electrically adjustable minimum high-frequency pass amplitude, a plurality of minimum phase shift high-frequency emphasis filters of different cutoff frequency and having electrically adjustable minimum low-frequency pass amplitude, an electrical network connecting said band-absorption filter and said low-frequency emphasis filters and said high-frequency emphasis filters in cascade between input terminals and output terminals, first frequency-responsive means connected to said input terminals responsive to the predominant frequency of the signal to be filtered, first control means connected to said first frequency-responsive means and to said band-absorption filter controlling the predominant frequency of the absorption band thereof in response to signal from said first frequency-responsive means, second frequency-responsive means connected to said output terminals responsive to the ratio of amplitudes of a plurality of predetermined frequency components in the signal from said output terminals, a plurality of amplitude comparators connected to said second frequency-responsive means and adapted to compare the amplitudes of adjacent frequency components and each producing a signal indicative of the sense of the measured comparison, and a plurality of trigger means connected to said respective comparators and to the respective adjustable elements in said low-frequency emphasis filters and to the respective adjustable elements in said high-frequency emphasis filters, whereby inverse filtering of the signal transmitted from said input terminals to said output terminals is accompanied by minimum phase shift.

References Cited by the Examiner
UNITED STATES PATENTS
2,976,408   3/1961   Colaguori _________ 333—76 X BENJAMIN A. BORCHELT, *Primary Examiner.*

R. M. SKOLNIK, *Assistant Examiner.*